US00RE34856E

United States Patent [19]

Daniels

[11] E Patent Number: Re. 34,856

[45] Reissued Date of Patent: Feb. 14, 1995

[54] METHOD AND APPARATUS FOR DISPENSING MERCHANDISE BAGS

[75] Inventor: Mark E. Daniels, Redondo Beach, Calif.

[73] Assignee: The Avantage Group, Inc., Redondo Beach, Calif.

[21] Appl. No.: 133,617

[22] Filed: Oct. 7, 1993

Related U.S. Patent Documents

Reissue of:

[64] Patent No.: 5,209,371
Issued: May 11, 1993
Appl. No.: 884,744
Filed: May 15, 1992

U.S. Applications:

[63] Continuation-in-part of Ser. No. 871,857, Apr. 21, 1992, abandoned.

[51] Int. Cl.[6] ..... B65H 1/00

[52] U.S. Cl. ..... 221/63; 225/1

[58] Field of Search ..... 221/63, 33, 34; 225/1, 225/106, 52, 39, 34; 242/55.2, 55; 211/16, 115; 206/390, 554, 409; 383/37, 8

[56] References Cited

U.S. PATENT DOCUMENTS

| | | | |
|---|---|---|---|
| 4,793,539 | 12/1988 | Haenni et al. | 221/63 |
| 4,849,090 | 7/1989 | Case et al. | 206/554 |
| 4,930,385 | 6/1990 | Wilfong et al. | 221/63 |
| 5,170,957 | 12/1992 | Carpenter | 221/63 |

*Primary Examiner*—Kenneth W. Noland
*Attorney, Agent, or Firm*—Beehler & Pavitt

[57] ABSTRACT

A method and device for dispensing [T-shirt type] plastic *merchandise* bags from a roll joined end to end in series but separable along perforated lines where the bag ends are connected, whereby the bags are rolled and the roll of bags is placed in a cradle for unrolling and passing between two bars above and parallel to the axis of the roll, at least one of the bars having a centrally disposed hooking snagging element past which the series of bags is drawn. When the open space between [the straps of each T-shirt bag] *adjacent bags* passes the snagging element, the latter catches the leading edge of the ensuing bag to restrain it sufficiently so that further pulling on the preceding bag results in its detachment along the perforated line for the ensuing bag. [Rack means are] *A rack is* provided to enable the method to be practiced.

12 Claims, 6 Drawing Sheets

METHOD AND APPARATUS FOR DISPENSING MERCHANDISE BAGS

Matter enclosed in heavy brackets [ ] appears in the original patent but forms no part of this reissue specification; matter printed in italics indicates the additions made by reissue.

This is a continuation-in-part of application Ser. No. 07/871,857, filed Apr. 21, 1992, now abandoned.

FIELD OF THE INVENTION

This invention relates to the field of plastic shopping bags with particular application to what are known as "T-shirt style merchandising bags" which are formed in series, but are detachable from each other upon the application of a certain degree of force. Bags of this nature are usually not produced in rolls.

BACKGROUND OF THE INVENTION

In recent years, plastic merchandise bags have largely supplanted paper bags in retail stores. Among the reasons for this development are the fact that plastic bags are cheaper, easier to handle, to ship and to store (particularly when they are provided in roll form); and that they are more easily recycled and may be readily provided in any of several desired sizes.

Among the more popular types of plastic bags are what have been termed "T-shirt" style merchandising bags. Heretofore, in the United States retailers have encountered problems, however, in removing plastic bags from rolls at cashier's or other merchandise packing stations, and doing so in an ergonomically and economically efficient manner. Among the problems encountered have been the disposition of the rolls under the counter, and the unrolling and detachment of bags from the rolls and their opening. As disclosed in U.S. Pat. Nos. 4,793,539 and 4,930,385, the bags are rolled up in such a manner that when the bags are unrolled, the bag bottoms appear first. This requires the person utilizing the bag then to invert the bag to open it in order to place the merchandise to be packed within the bag. The bags also may be difficult to pull through the nozzles disclosed in the patents, and when finally pulled through the nozzle, the bags are so wrinkled as to be unsightly, and hence, not appreciated by the store's customers, or the store's checker who has to open them for loading.

In addition, the nozzles may not function properly all of the time. The bag being pulled out may not detach from succeeding bags so that the packer has to cope with more than one bag. It is also possible for an ensuing bag to drop back through the nozzle which then requires re-loading up through the nozzle.

Another objection to the nozzle system disclosed in the patents mentioned above is that the counter must be bored to provide holes large enough to enable the nozzles to be inserted and secured in the counter. This may require special boring equipment and skill. Such holes also ruin the counter for other uses, should the nozzles later be removed and the patented system abandoned. In addition, holes and nozzles in the counters decrease the usable counter space and may interrupt the flow of articles across the counter at the cashier's station.

Further, loading the rolls under the counter and threading the first bags through the nozzles as shown in these patents, would appear to require some type of kneeling operation—one which might not be appreciated by older or handicapped clerks, or women with nylon stockings.

Following applicant's invention, applicant has been informed that in Europe, as shown in at least one Scandinavian advertisement, small T-shirt type bags connected in series have been dispensed, straps first, from a roll in a housing having slotting, the center of which is constricted by opposed V-shaped flat members, the function of which, applicant understands, has been to snag ensuing bags as they are pulled through the housing slotting. This arrangement, however, has not lent itself to loading from behind the counter, as well as conveniently withdrawing and opening the bags. Nor has it been adopted nor suited for multiple sizes of plastic bags. With this arrangement, it is possible to pull multiple undetached bags through the U-shaped flat members without snagging them by pulling the first bag at an incorrect angle. The size of the housing restricts the number of bags on the roll to a relatively small amount. The bags can only be side-loaded as the arrangement does not permit either front or top loading.

SUMMARY OF THE INVENTION

The present invention provides a system, method and apparatus by which a roll of [T-shirt style] merchandise bags may easily be loaded into a rack either above or below the counter of the cashier or other person packing the merchandise and the first bag threaded between a pair of bars disposed, ideally, at about the height of the clerk's waist, or at any other suitable height. The bags are rolled up bottom first so that they unroll with their T-straps appearing in the lead. The rack provides means for enabling bags from the roll to be withdrawn; and, as each bag is so withdrawn, the inner edge between the T-straps of the ensuing bag is snagged and temporarily restrained sufficiently to result in detachment of the preceding bag from the leading edges of the straps of the bag thus temporarily restrained, when continued pulling is exerted upon the preceding bag.

In this system and by this method, the cashier or packer receives the bag in a top-up, bottom-seal-down position so that it may immediately be opened for the merchandise to be placed within it.

The method and system may be accomplished by means of a novel rack which may be secured above or below the counter. In one embodiment of this invention, this rack includes a cradle which may be front loaded from behind the counter and a pair of transverse spaced-apart guide bars above the cradle through which the leading edges of the initial bag in the roll are to be drawn. To accomplish the desired snagging in various embodiments of the invention, the bars are provided centrally with a pair of opposed overlapping (preferably U-shaped) elements which are bent oppositely and spaced apart from each other sufficiently to allow the bags to be pulled between them. These elements serve to snag and temporarily restrain the inner edge between the T-straps of each bag which follows the bag being withdrawn through the pair of transverse guide bars. By such restraint, the ensuing bag is held sufficiently to enable the bottom of the preceding bag, by continued pulling, to be detached from the leading edges of the straps of the restrained bag, along the perforations joining such edges to the bottom of the preceding bag.

In another embodiment of the invention, the snagging may be accomplished by providing a single element on one of the two spaced-apart guide bars, such element being constructed to catch and temporarily hold the leading edge of each bag between the straps as such straps are pulled through the bars.

The system of the invention may actually comprise pulling with one hand the bags from a roll one at a time by either strapped top ends over any type of guiding edge, such as the rim of a box, and snagging the edge portion of each bag between the straps by using the other hand.

In one embodiment of the invention, the cradle may be stationary, while in a further embodiment of the invention, the cradle may be forwardly tiltable to facilitate the front loading of the roll from behind the check-out counter. In both embodiments, however, a method of the invention involves bringing the strap ends of the bag through the spacing between a pair of transverse guide bars and the spacing between the centrally disposed opposed overlapping elements, or other snagging element. Each bag of the roll is then removed by simply pulling the center of the bag or the bag strap ends which protrude between the transverse guide bars, thereby causing the bag roll to rotate in its cradle and to allow unrolling of the bag which is being grasped and pulled. It will be followed by the attached ensuing bag until the inner edge between the T-straps of the succeeding bag is temporarily snagged by the overlapping elements or other snagging element, thereby providing sufficient temporary resistance to further unrolling of the succeeding bag to result in the detachment of the bottom of the bag which is being pulled along the perforated connections from the leading edges of the straps of the succeeding and temporarily restrained bag. When the next bag is to be withdrawn from the roll, the checker or packer at the counter simply slides the restrained edge out of the opposed overlapping elements or other snagging element and pulls the bag again through those elements and the spaced apart transverse guide bars to repeat the process.

In a still further embodiment of the invention two parallel cradles may be provided, one to carry a roll of bags of one size and the second, a roll of bags of a different size. In this embodiment, the cradles may be disposed one behind the other with the paths of the bags being parallel but separated from each other by a guide member over which the bags of one roll are drawn before moving forward to a rack having a pair of transverse bars each with a snagging element similar to that described above for the single roll embodiment. The guide member may either be integrated into the rack itself or it may be separately mounted to the underside of the counter. Preferably, the cradle for the roll of smaller size bags should be disposed to the rear of the cradle for the larger sized bags so that the latter bags will be below the smaller bags for grasping by the clerk or cashier at the counter. Thereby, the clerk or cashier may see the availability of both bags. Should the larger bags come out above the smaller bags, the latter may not be readily visible to the clerk or cashier.

It will be found that the method and apparatus of the present invention provide a most convenient system for a checker behind a counter to remove bags from a roll. Moreover, as the bags are detached into the hands of the checker they are ready to be opened, thereby enabling the checker conveniently to deposit the customer's merchandise in the bag, the straps of which may or may not then be tied in a knot and the bag handed to a customer. In addition, the bags when presented to the customer will be in an unwrinkled condition.

While it is preferred that the bag roll be wound so that the bags unroll with the bag straps appearing first, the method and apparatus of the present invention may be adapted to dispense bags which are rolled so that the bag bottoms appear first. Bags so rolled will be found also to be snagged for separation, but at their bottoms instead of at the transverse portion defining the cut-out.

The rolling up of the bags and the snagging system herein discussed may, however, have many other applications apart from retail stores.

DESCRIPTION OF THE PREFERRED EMBODIMENT

Figure 1:
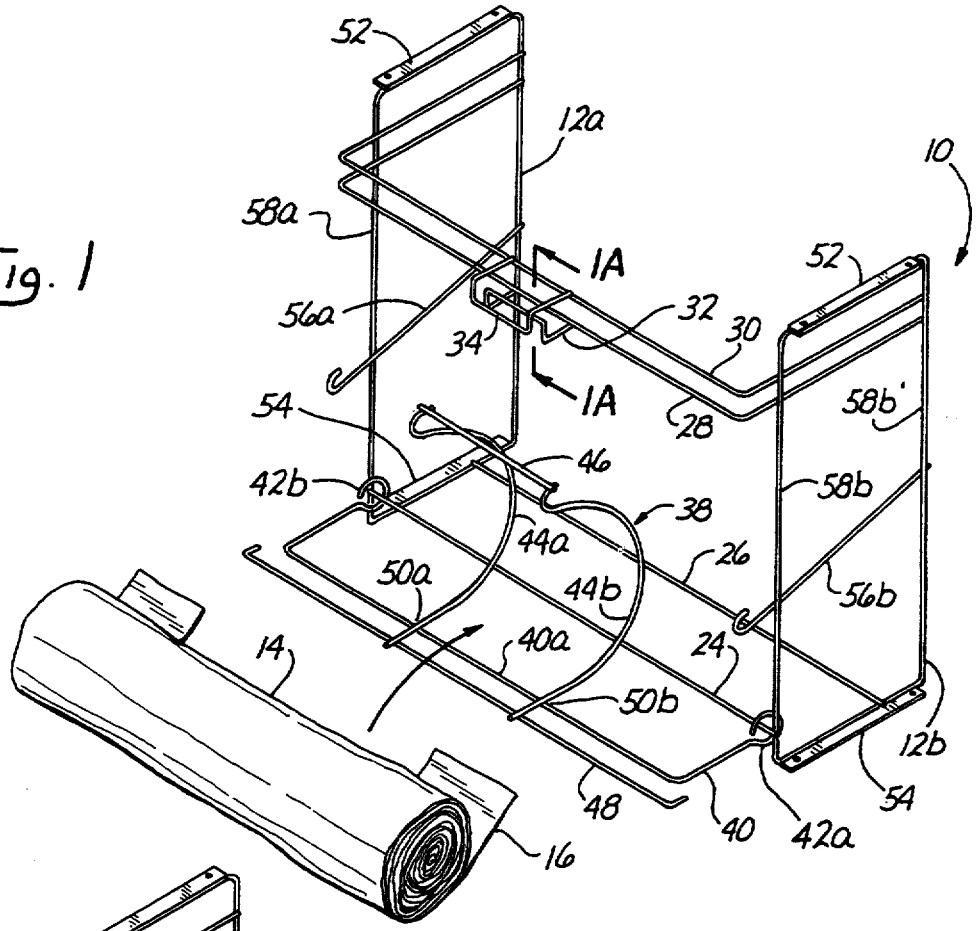
FIG. 1 is a perspective view of one embodiment of the rack showing the manner in which a roll of bags may be deposited in the cradle.

Referring to FIGS. 1 through 4 of the drawings, the method of the present invention may be practiced by providing a rack 10 formed of a pair of vertical wire rectangles 12a and 12b spaced apart from each other by the width of a roll 14 of T-shirt type bags 16, 16', etc. The bottom edge 18 of each bag 16, 16', etc. is perforatedly secured to the leading edges 20' of the straps 22' of the next succeeding bag 16', etc. so that upon the application of any pulling force along the bottom edge 18, when movement of the straps 22' is restrained, will result in detachment of the bag 16 from the ensuing bag 16', and similarly, in the case of bag 16' with the bag that next follows it in the roll 14.

The two Wire rectangles 12a and 12b may be secured oppositely in parallel alignment by transverse base members 24, 26 and a pair of U-shaped guide bars 28 and 30 spaced apart from each other. Centrally disposed on each of the U-shaped elements 28 and 30 is a forwardly projecting bent U-shaped element 32, 34, respectively, shown in enlargement in the sectional view FIG. 1A. Element 32 is slightly shorter than element 34 and is bent at a 90 degree angle to provide a vertical segment 32a. While element 34 is bent vertically in an opposite and downward direction to provide a segment 34a which overlaps slightly the transverse segment 32b of the element 32, thereby leaving a space 36 between 32a and 32b, and 34a and 34b.

While the overlapping elements 32 and 34 are thus described in this specific configuration, as the preferred embodiment, it is not necessary that they be U-shaped as so shown, but the overlapping element could be in other configurations which would temporarily arrest the passage of the bag by catching its leading edge 17.

In the embodiment of FIGS. 1 through 4, a swinging cradle 38 is provided to receive the roll 14. This cradle may be formed of a U-shaped member 40 having looped ends 42, 42a, 24b, which may be wrapped around the ends of the transverse member 24. A pair of curved elements 44a and 44b terminating in transverse members 46 and 48 may be secured at 50a and 50b to the transverse portion 40a of the U-shaped member 40. Upper and lower orificed mounting plates 52, 54, respectively, may be secured to the upper and lower transverse portions of the rectangular frame members 12a and 12b.

A pair of hooked elements 56a and 56b may be secured to the vertical portions 58a, 58a' and 58b and 58b', respectively, of the rectangular elements 12a and 12b.

Figure 2:
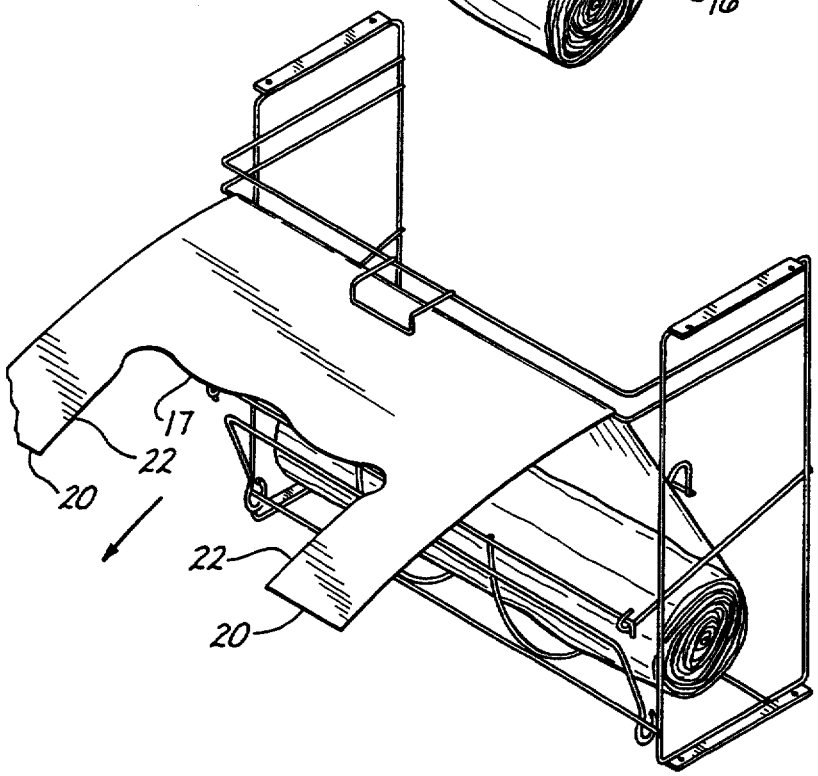
FIG. 2 is a similar perspective view of the same type of rack shown in FIG. 1, showing the rack loaded with the initial bag in position for grasping and pulling by the checker.
Figures 1A, 3:
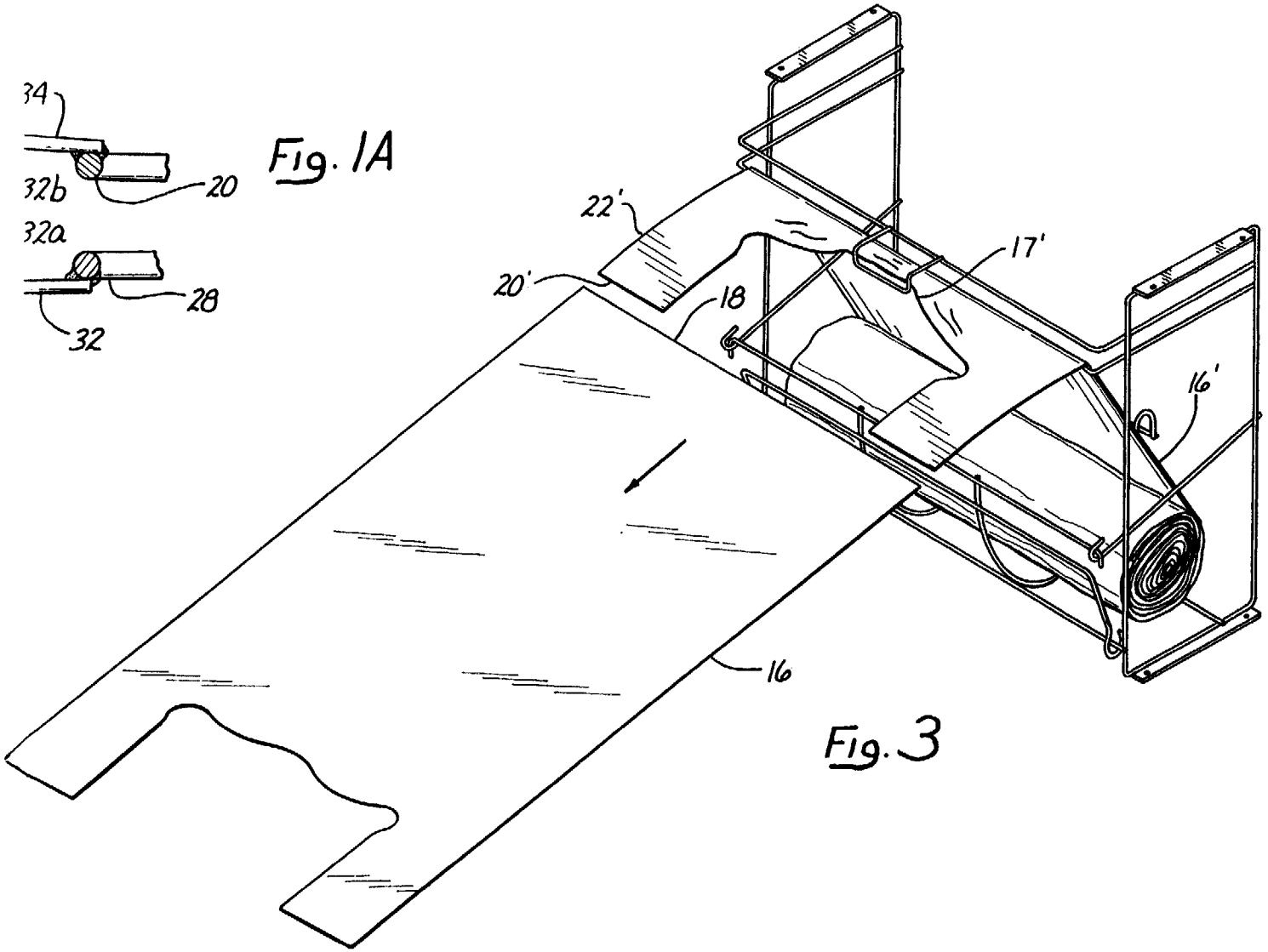
FIG. 1A is an enlarged section taken on the lines 1A/1A of FIG. 1.
FIG. 3 is a perspective view similar to that of FIGS. 1 and 2, but showing the first bag being removed and detached from the ensuing bag.
Figure 4:
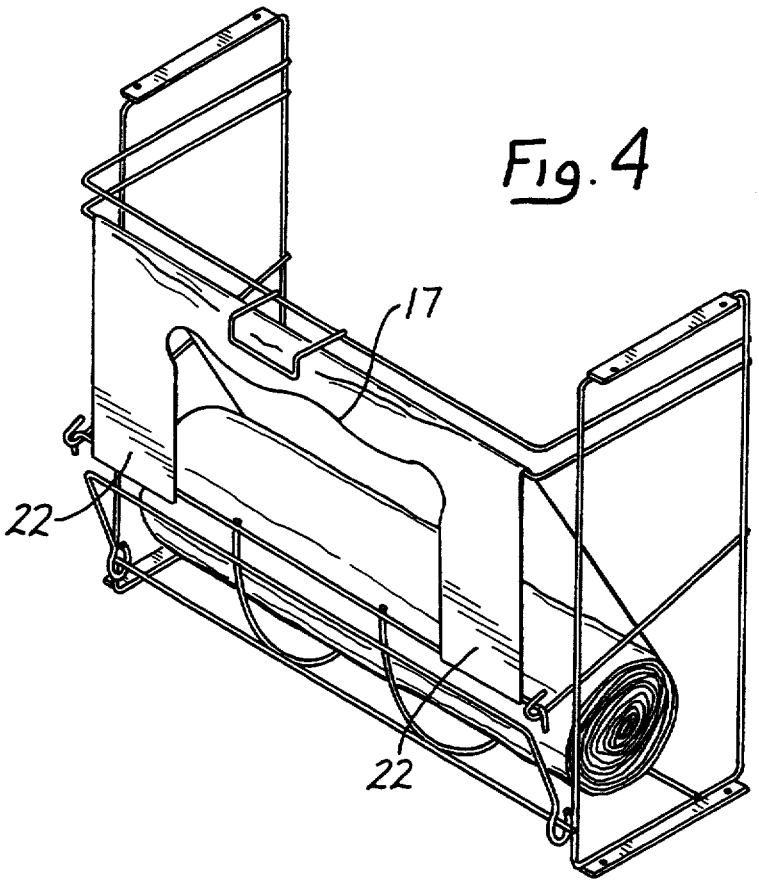
FIG. 4 is a still further perspective view similar to the views of FIGS. 1 through 3 of the rack, but showing the ensuing bag now ready for removal.

In practicing the method in the system of the present invention, the bags 16, 16', etc., which are formed in an interconnected series, are first rolled, commencing with the bottom of the first bag and ending with the straps 22 of the last bag. With the cradle swung out in the position shown in FIG. 1, the roll 14 is laid into the cradle, which is then swung back and hooked as shown in FIG. 2. The leading strap edges 20, together with the leading transverse intermediate edge 17 of the first bag is brought through the spacing between the U-shaped transverse guide bars 28 and 30 and the spacing 36 between the bent U-shaped elements 32 and 34 to the position shown in FIG. 4. With the initial bag 16 so positioned, the person at the checkout counter may remove a bag to pack a customer's purchase by withdrawing the bag 16 in the direction initially as shown in FIG. 2 to where the initial bag 16 is withdrawn from the rack, and the transverse portion 17 of the ensuing bag is brought into the spacing 36 between the elements 32 and 34, at which point further passage of the second bag 16' will temporarily be restrained. Further pulling On the first bag 16 will result in detachment of the bag 16 from the leading edges 20' of the straps 22' of the bag 16'. The bag 16 may then be filled by the person at the checkout counter. In the meantime, the straps 22' and the transverse portion 17' of the next bag will drop down into the position shown in FIG. 4, in which position, the person at the checkout counter may now grasp the leading edge 17' or any other part of the bag 16' and commence pulling the bag 16' forward in the manner shown in FIG. 2—unrestrained by the U-shaped elements 32 and 34. The process may be repeated until all of the bags from the roll 14 have been utilized, whereupon a new roll of bags should be provided in the cradle 38 after it is unhooked and swung forward to the position shown in FIG. 1.

While the roll 14 is shown in FIGS. 1–5 as unrolling from the back side, it could also be unrolled oppositely from the front.

Figure 5:
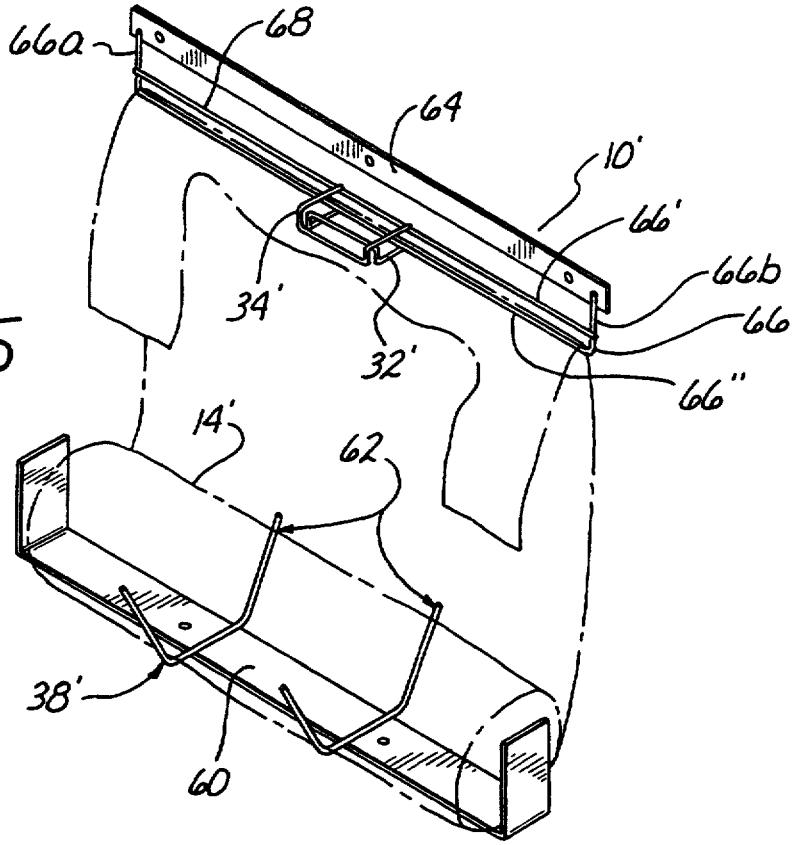
FIG. 5 is a perspective view of a different cradle and guide bar arrangement, in which the cradle and guide bar arrangements are separated entities.

The method described may also be practiced with a different type of cradle and guide bar arrangement such as that shown in FIG. 5. In the embodiment of this latter figure, a different type of cradle 38' may be provided. The cradle 38' may be constructed of a U-shaped plate 60 which may be permanently secured to shelving below the counter. This plate 60, in the embodiment of FIG. 5, is shown with a pair of bent wire receptacles 62 which may be welded or otherwise secured to the plate 60. The cradle 38' is left open so that it may be loaded from the top under or above the counter with a roll 14'. To practice the method, however, a different type of transverse guide bars 10' may be provided for mounting under or over the counter or against the edge of the counter. This transverse guide bar may be in the form of a plate 64, to which is secured the ends 66a, 66b of a U-shaped member 66. Having a second transverse piece spaced inwardly from the transverse segment 66' of the member 66. In this second rack embodiment, opposed U-shaped elements 32' and 34' are provided similarly to the members 32 and 34 of the FIGS. 1–4 embodiment.

It will be appreciated that with the cradle 38' and rack 10', bags 16, 16', etc. may be drawn from the roll in essentially the same manner and by the same method as that which has been described in connection with the FIGS. 1–4 inclusive embodiment.

While it is preferred to support the roll by a cradle, such as those which have been described heretofore, it will also be understood that the manner in which the roll is supported for unrolling, is not a critical feature of the present invention so long as the support disposes the roll about an axis which is substantially parallel to the bars 28 and 30. Thus, the support could be in the form of the box 70 shown in FIG. 7 or it could be a spindle, not shown, passed through the center of the roll 14 and supported at one or both ends in the manner commonly found for paper towel rolls, toilet paper rolls, etc. The term "cradle" or "cradle means" should be understood to encompass such means for dispensing the roll parallel to the bars 28 and 30.

Figure 6:
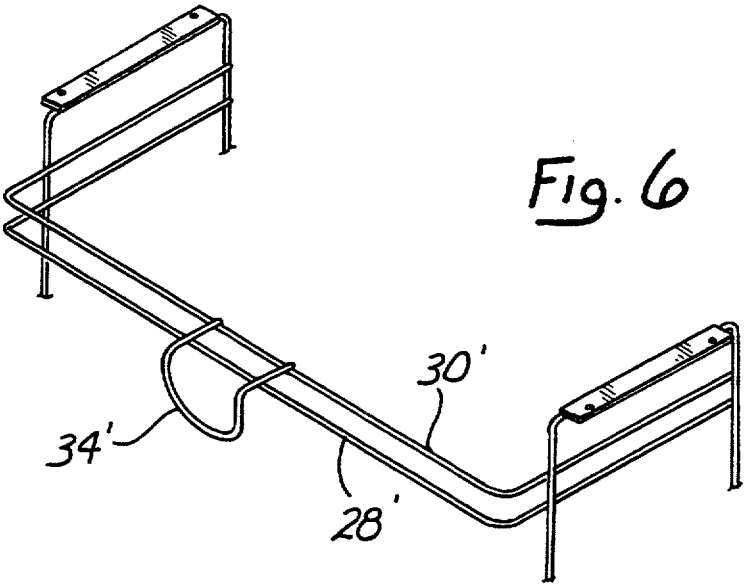
FIG. 6 is a perspective view of an alternate upper portion snagging mechanism of the radii of FIG. 1.

In the embodiment of FIG. 6, a single snagging element 34' is provided in lieu of the overlapping U-shaped elements 32, 34 of the embodiments of FIGS. 1–5. When the bags 16 (not shown) are drawn between the bars 28', 30' in the direction shown in FIGS. 2 and 3, it will be found that the snagging element 34' will temporarily snag the leading edge 17' of the ensuing bag 16' so that the preceding bag 16 will be detached from the edges 20 of the straps 22' upon the application of further pulling force, just as in the case of the FIGS. 1–4 embodiment.

Figure 7:
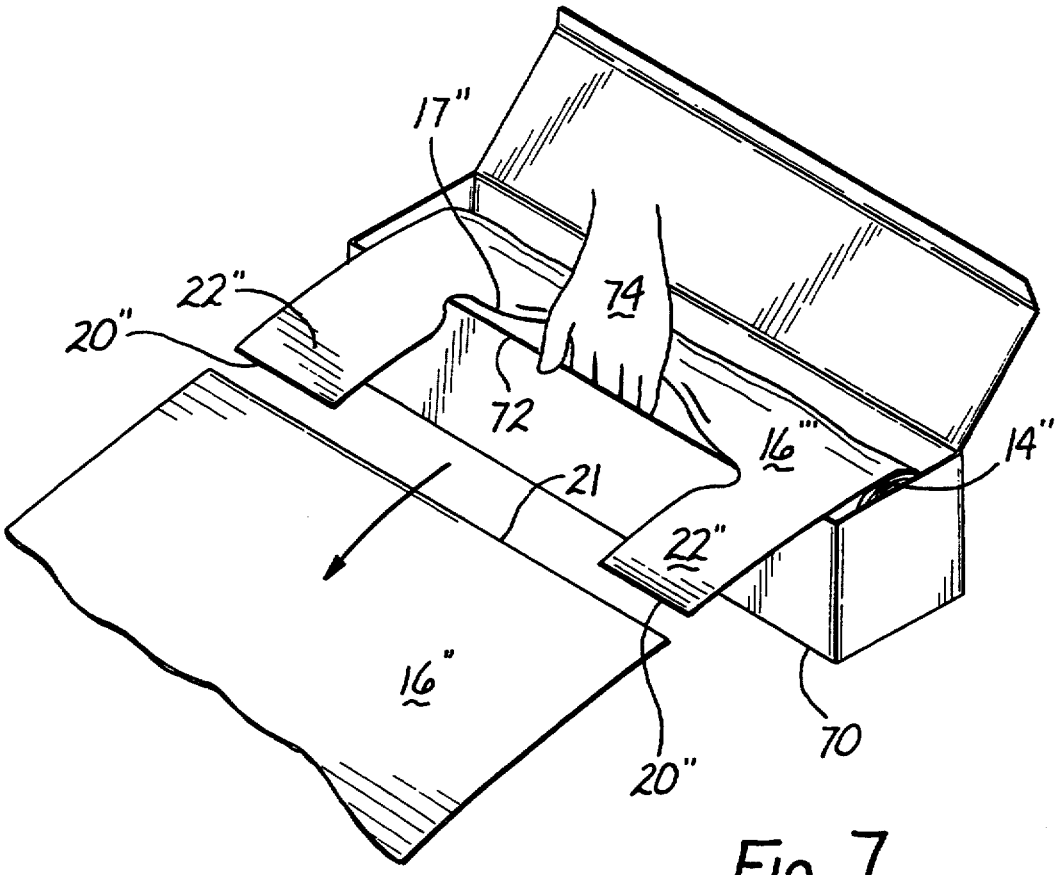
FIG. 7 is an illustration of the method as practiced manually.

FIG. 7 illustrates how the method of the present invention may be practiced manually without any cradle and rack of the FIGS. 1–6 embodiments. Thus, in FIG. 7, the roll 14' of bags 16' formed, as heretofore explained, is simply laid in a box 70 having a straight edge 72, parallel to the roll axis. The bags 16' are then drawn out of box 70 over the straight edge 72 with one hand (not shown) while the person's other hand 74 is held adjacent the straight edge 72 to catch and temporarily restrain forward movement of the leading edge 17" of the ensuing bag 16", with the result that the trailing bottom edge 21 will detach from the leading edges 20" of the straps 22".

Figure 8:
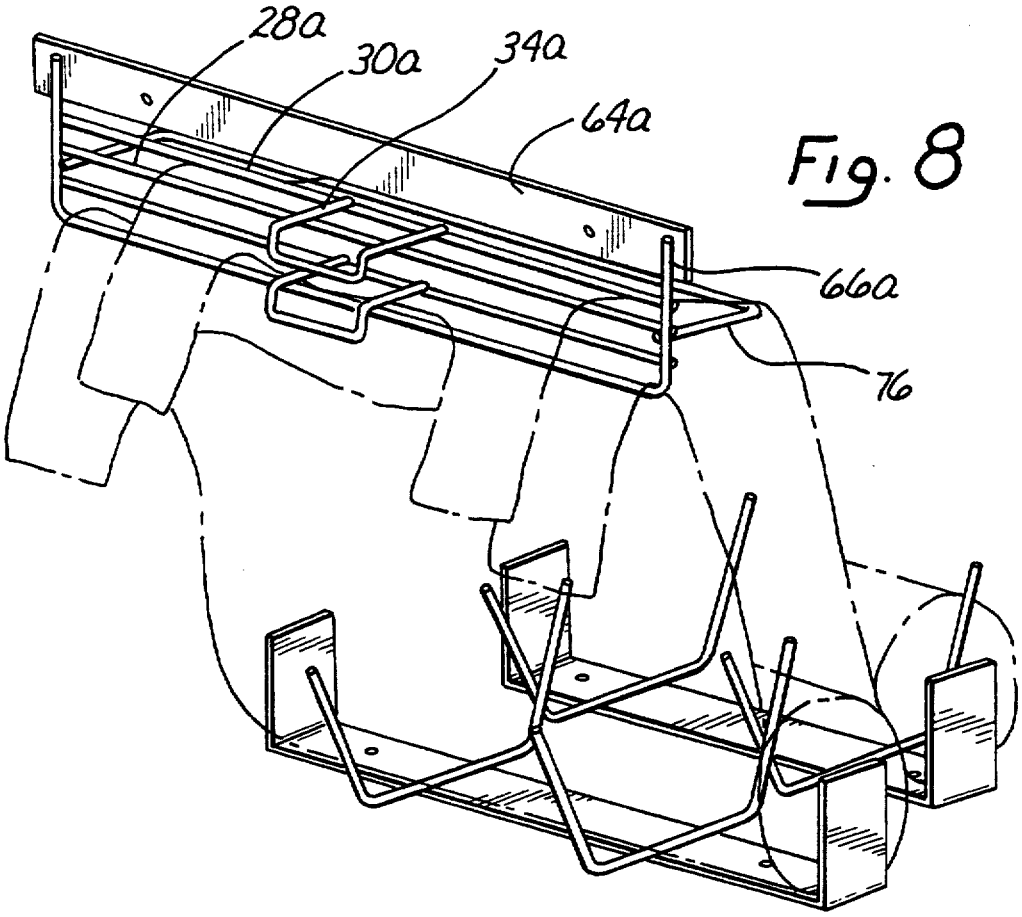
FIG. 8 is a perspective view of the embodiment of the invention in which two rolls of bags are brought up for dispensation.
Figure 9:
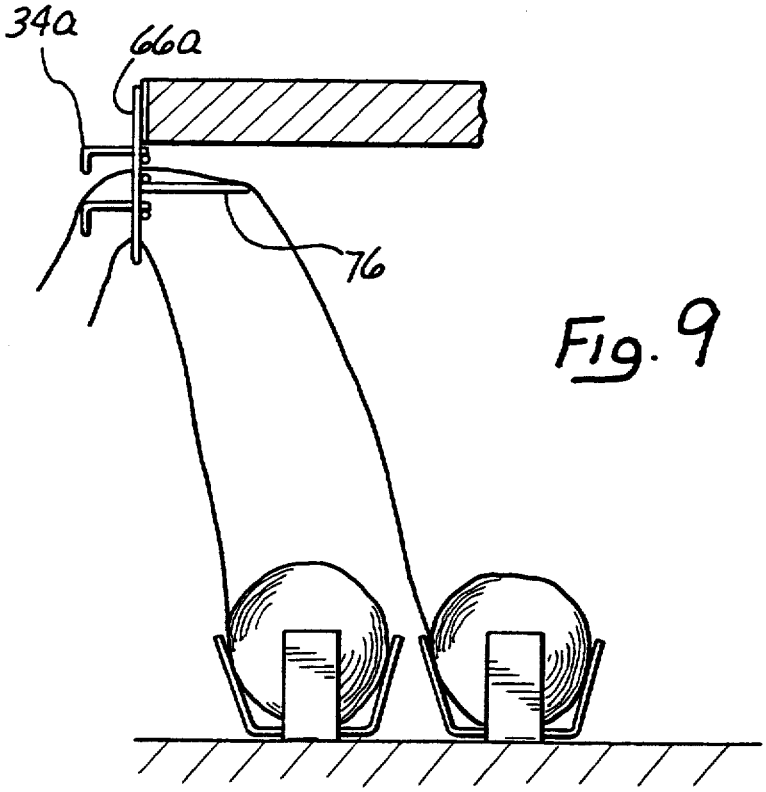
FIG. 9 is a side elevation of the embodiment shown in FIG. 8.
Figure 10:
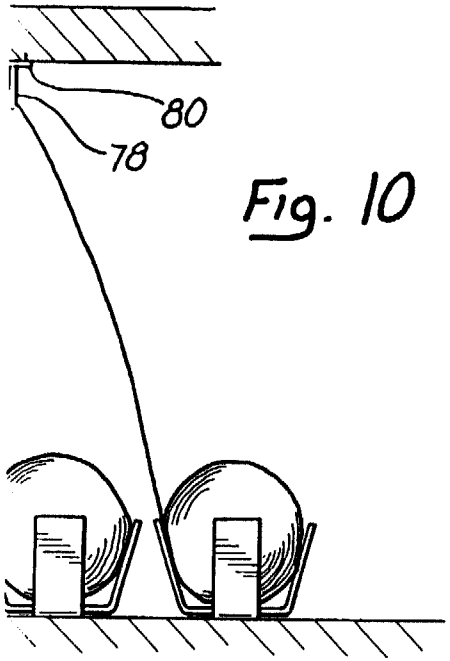
FIG. 10 is a partial view of the guide member shown in FIG. 9 in an alternate form.

FIGS. 8 and 9 illustrate the manner in which the method of the present invention may be utilized to dispense bags from two rolls. In this embodiment, a U-shaped member 66a is mounted on a plate 64a similar to what is shown in FIG. 5. However, the member 66a is provided with a second pair of bars 28a, 30a with a single snagging element similar to 34' shown in FIG. 6. In the embodiment of FIGS. 8 and 9, there is also secured to the member 66a a U-shaped guide piece 76, the function of which is to keep the path of the plastic bags of the second roll substantially parallel to the bags of the first roll as the bags move up and between the bars 28a and 30a for interception by the snagging element 34a. In this embodiment of the rack, the clerk at the counter may have available for dispensing two different size bags as shown in FIG. 8. FIG. 10 represents a modification of the arrangement shown in FIGS. 8 and 9 to the extent of eliminating the U-shaped guide 76 from the member 66a. Instead, a U-shaped member 78 is mounted at both of its ends to a plate so screwed to the counter, to produce a result identical to that accomplished by the guide piece shown in FIGS. 8 and 9.

Figure 11:
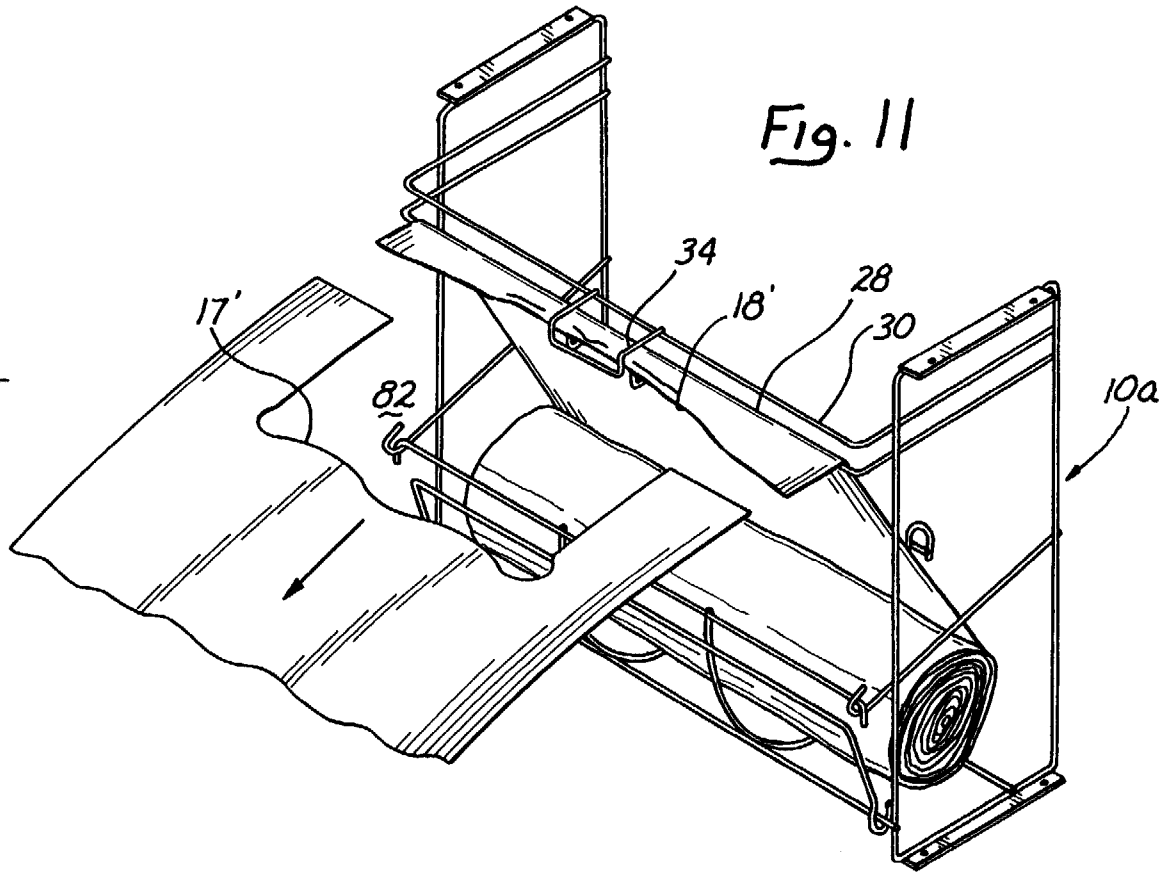
FIG. 11 illustrates an alternate method of dispensing the bag.

In FIG. 11, the rack 10a is substantially identical to the rack 10 shown in the FIGS. 1–4 embodiment, but instead of the bags being brought up from the roll straps first, as shown in FIGS. 1–4, the bags are delivered to and through the bars 28 and 30 bottom first since that is the manner in which the bags are rolled. The rack and the system, however, are still effective since the snagging element 34 effectively restrains the bottom of the bag which represents the trailing edge defining the open space 82 between each of the series of bags coming off the roll. In this instance, the leading edge 17' defining the space 82 corresponds with the leading transverse intermediate edge 17 shown in FIG. 2.

Thus, it will be seen that, irrespective of the manner in which the bags have been rolled, the rack of the present invention is effective to enable the method to be practice.

From the foregoing, it may be appreciated that the method of the present invention may be practiced in several ways, although doing so with one of the types of racks illustrated and described herein should be found to be more convenient and practicable.

I claim:

1. A method of dispensing from a plurality of T-shirt plastic shopping bags detachably joined together in a series, at a cashier's or other packer's station, each bag being formed by a pair of facing panels, joined at their bottoms and sides, the sides terminating at their upper ends in a pair of top straps spaced from each other, each strap having a transverse closed upper edge, a transverse open top extending between the straps below their upper edges, and the first bag being detachably joined to the next ensuing bag at the bottom of the first bag by the upper edges of the top straps of the next ensuing bag, and the subsequent bags in the series each being detachably joined to its preceding bag by the upper edges of its top straps to the bottom of its preceding bag; said method comprising:

(a) rolling up said series of bags concentrically about a first axis starting with the bottom of the initial bag of the series to form a roll of said series of bags, said roll having the pair of top straps of the outermost bag of the roll as the starting portion of the roll;

(b) providing a support for the roll from which support bags may be serially unrolled upwardly and detached;

(c) providing a pair of bars spaced slightly apart from each other one bar above the other, said bars being parallel to the roll axis and disposed above and in line with the roll to establish a first direction of travel for the series of bags between the roll and spacing between the bars, at least one of said bars being provided with a snagging element transverse to said first direction of travel of the series of bags, said snagging element, however, permitting passage of the panel portions of each bag past said snagging element in the first direction, but snagging the transverse open top of each bag when pulled in said first direction by releasing said open top only when it is drawn between the bars in a second direction transverse to the first direction;

(d) grasping the leading portion of the outermost bag and pulling the outermost bag through the spacing between the bars and the snagging element in the first direction until the transverse open top of the next ensuing bag reaches the snagging element, whereupon further passage of said ensuing bag will be initially restrained;

(e) further pulling the outermost bag against such restraint, thereby detaching the bottom of the outermost bag from the top edges of the straps of said ensuing bag; and (f) pulling the transverse open top of the said ensuing bag first in the second direction past the snagging element and then, in the first direction until the open top of the second ensuing bag is snagged by the snagging element, for a repetition of the previous steps.

2. A method of dispensing bags separately from a plurality of T-shirt plastic shopping bags detachably joined together in a series, at a cashier's or other packer's station, each bag being formed by a pair of facing panels, joined at their bottoms and sides, the sides terminating at their upper ends in a pair of top straps spaced from each other, each strap having a transverse closed upper edge, a transverse open top extending between the straps below their upper edges, and each bag being detachably joined by perforations to an ensuing similar bag, the ensuing bag being attached to the preceding bag at the bottom of the preceding bag by the upper edges of the top straps of the ensuing bag; said method comprising:

(a) rolling up said series of bags concentrically about a first axis starting with the bottom of the initial bag of the series to form a roll of said series of bags, said roll having the pair of top straps of the outermost bag of the roll as the outer starting portion of the roll;

(b) providing a support for the roll from which support bags may be serially unrolled upwardly and detached;

(c) providing a guide member parallel to said first axis in the vicinity of said rolls;

(d) pulling the outermost bag in the roll in a first direction between the roll and past said member;

(e) snagging the transverse open top of the ensuing bag as it passes said member temporarily to restrain the ensuing bag;

(f) continuing to pull the outward bag against said restraint thereby to detach the portion of the outward bag from the top straps of ensuing bag along the perforations;

(g) unsnagging the transverse open top of the ensuing bag and pulling it past the guide member until the transverse open top of the next ensuing bag is snagged, to repeat the process.

3. A method of dispensing from a plurality of T-shirt plastic shopping bags detachably joined together in a series, at a cashier's or other packer's station, each bag being formed by a pair of facing panels, joined at their bottoms and sides, the sides terminating at their upper ends in a pair of top straps spaced from each other, each strap having a transverse closed upper edge, a transverse open top extending between the straps below their upper edges, and each bag being detachably joined by perforations to an ensuing similar bag, the ensuing bag being attached to the preceding bag at the bottom of the preceding bag by the upper edges of the top straps of the ensuing bag, and each subsequent bag being detachably joined to its preceding bag by the upper edges of its top straps to the bottom of the preceding bag; said method comprising:

(a) rolling up said series of bags concentrically about a first axis starting with the bottom of the initial bag of the series to form a roll of said series of bags, said roll having the pair of top straps of the outermost bag of the roll as the outer starting portion of the roll;

(b) providing a support for the roll from which support bags may be serially unrolled and detached;

(c) providing a pair of bars spaced slightly apart from each other one bar above the other, said bars being parallel to the roll axis and disposed in line with the roll, the upper bar having extended from its center section, a first element having an angular bend downwardly and the lower bar having extended from its center section a second element having an angular bend upwardly, said first and second elements being overlappingly spaced apart from each other;

(d) passing the pair of top straps of the outermost bag of the roll through the spacing between the bags and drawing the transverse intermediate open top of the bag through the overlapping spacing between the said first and second elements;

(e) pulling the outermost bag through said spacing between the bars until the transverse open top of the next bag on the series reaches the spacing between the first and second overlapping elements, whereupon further passage of the next bag will be initially restrained; and (f) further pulling the initial bag against such restraint, thereby to detach the pulled bag from the next bag in the series.

4. Rack means for dispensing separately from a roll of a series of T-shirt type plastic bags, said series of bags of said roll being disposed concentrically about a first axis starting with the bottom of the initial bag of the series, whereby the outermost portion of said roll comprises the pair of top straps of the outermost bag of the roll, and the leading portion of each ensuing bag comprises the top straps of said ensuing bag, whereby each bag may be grasped and pulled by its transverse open top for detachment from the next ensuing bag when the ensuing bag is sufficiently restrained from movement following the preceding bag; said rack means comprising:

(a) cradle means securable in the vicinity of a checkout counter, said cradle means being adapted to receive and permit rotation of said roll so that the bags on said roll may be unrolled about said first axis;

(b) a pair of bars disposed parallel to said first axis, said bars being spaced apart from each other, and both bars being spaced, from but aligned with, said roll and disposed in such a manner that a bag being unrolled from said roll may be passed through the spacing between the bars, the first of said pair of bars being disposed parallel to and above the second of said bars, at least one of said first and second bars having extending from its central area a snagging element, whereby the panel portion of a bag may be passed between the spacing between said bars and past said snagging element until the transverse open top of the ensuing bag is intercepted by the snagging element and temporarily restrained, thereby, continued pulling of the preceding bag, results in detachment of the bottom of the preceding bag from the top straps of the ensuing bag.

5. A method of dispensing from a plurality of T-shirt plastic shopping bags detachably joined together in a series, at a cashier's or other packer's station, each bag being formed by a pair of facing panels, joined at their bottoms and sides, the sides terminating at their upper ends in a pair of top straps spaced from each other, each strap having a transverse closed upper edge, a transverse open top extending between the straps below their upper edges, each bag being detachably joined to two adjacent bags at its opposite ends so that at one end the joinder is by the upper edges of its bag straps, and at the other end, the bag bottom is joined to the upper edges of the straps of an adjacent bag, and at each joinder is an open space defined by a portion of a bag bottom and the inner edges of the straps and the transverse open top of the adjoining bag; said method comprising:

(a) rolling up said series of bags concentrically about a first axis whereby when said bags are unrolled each open space between adjacent bags will appear partially defined by a leading transverse edge and a trailing transverse edge;

(b) providing a support for the roll from which support bags may be serially unrolled upwardly and detached;

(c) providing a pair of bags spaced slightly apart from each other one bar above the other, said bars being parallel to the roll axis and disposed above and in line with the roll to establish a first direction of travel for the series of bags between the roll and spacing between the bars, at least one of said bars being provided with a snagging element transverse to said first direction of travel of the series of bags, said snagging element, however, permitting passage of the panel portions of each bag past said snagging element in the first direction, but snagging the trailing transverse edge partially defining the open space between the bags as the bag including the leading transverse edge partially defining said open space is pulled in the first direction and releasing the last said bag only when it is drawn between the bars in a second direction transverse to the first direction;

(d) grasping the bag which includes said leading transverse edge and pulling the last said bag through the spacing between the bars and the snagging element in the first direction until the trailing edge defining the open space of the next ensuing bag reaches the snagging element, whereupon further passage of said next ensuing bag will be initially restrained;

(e) further pulling the bag including said leading edge against said restraint to where said bag is detached from the next ensuing bag;

(f) pulling the next ensuing bag first in the second direction past the snagging element and then in the first direction until the trailing edge defining the open space between the last said bag and following bag is snagged by the engaging element, and initially restrained; and (g) repeating steps (e), (f) and (d) in that order for subsequent bags in the series.

6. The method as defined in claim 5 wherein as second roll of bags is disposed adjacent and parallel to the first roll, a second pair of bars similar to the bars of claim 5 is provided and disposed parallel to and spaced from the bars of claim 5, and the bags of the second roll are brought along a path closely parallel to, but spaced from, the path of the first roll for snagging and disposition in a manner identical to that of the first roll, whereby a clerk may select for utilization the bags from either roll.

7. The method as defined in claim 6, wherein the path of the bags of the second roll are passed above the path of the bags of the first roll where the second pair of bars is disposed.

8. Rack means for dispensing separately from a roll of a series of T-shirt type plastic bags, each bag being formed by a pair of facing panels, joined at their bottoms and sides, the sides terminating at their upper ends in a pair of top straps spaced from each other, each strap having a transverse closed upper edge, a transverse open top extending between the straps below their upper edges, and each bag being detachably joined to two adjacent bags at its opposite ends so that at one end the joinder is by the upper edges of its bag straps, and at its other end the bag bottom is joined to the upper edges of the straps of the adjacent bag, said series of bags of said roll being disposed concentrically about a first axis starting with the top straps of the initial bag of the series, whereby the outermost portion of said roll comprises the bottom of the outermost bag of the roll and the leading portion of each ensuing bag comprises the bottom of said ensuing bag, whereby each bag may be grasped and pulled by its bottom for detachment from the next ensuing bag when the ensuing bag is sufficiently restrained from movement following the preceding bag; said rack comprising:

(a) cradle means securable in the vicinity of a checkout counter, said cradle means being adapted to receive, and permit rotation of, said roll so that the bags on said roll may be unrolled about said first axis;

(b) a pair of bars disposed parallel to said first axis, said bars being spaced apart from each other, and both bars being spaced from, but aligned with, said roll and disposed in such a manner that a bag being unrolled from said roll, may be passed through the spacing between the bars the first of said pair of bars being disposed parallel to and above the second of said bars, at least one of said first and second bars having extending from its central area a snagging element, whereby the panel portion of a bag, when the bag is pulled in a first direction, may be passed between the spacing between said bars and past said snagging element until the bottom of the ensuing bag is intercepted by the snagging element and temporarily restrained, whereby, continued pulling of the preceding bag against such restraint results in detachment of the top straps of the preceding bag from the bottom of the ensuing bag, but the ensuing bag may be freed from such restraint by being pulled in a second direction transverse to the first direction.

9. Rack means for dispensing separately from a roll of a series of T-shirt type plastic bags, each bag being formed by a pair of facing panels, joined at their bottoms and sides, the sides terminating at their upper ends in a pair of top straps spaced from each other, each strap having a transverse closed upper edge, a transverse open top extending between the straps below their upper edges, and each bag being detachably joined to two adjacent bags at its opposite ends so that at one end the joinder is by the upper edges of its bag straps, and at its other end the bag bottom is joined to the upper edges of the straps of the adjacent bag, and at each joinder is an open space defined by a portion of a bag bottom, the inner edges of the straps and the transverse open top of the adjacent bag, and series of bags of said roll being disposed concentrically about a first axis, whereby when the bags are unrolled each open space between adjacent bags will appear partially defined by a leading transverse edge of the preceding bag and a trailing transverse edge of the next ensuing bag, whereby each bag may be grasped and pulled for detachment from the next ensuing bag when the ensuing bag is sufficiently restrained from movement following the preceding bag; said rack comprising:

(a) cradle means securable in the vicinity of a checkout counter, said cradle means being adapted to receive, and permit rotation of, said roll so that the bags on said roll may be unrolled about said first axis;

(b) a pair of bars disposed parallel to said first axis, said bars being spaced apart from each other, and both bars being spaced from, but aligned with, said roll and disposed in such a manner that a bag being unrolled from said roll, may be passed through the spacing between the bars, the first of said pair of bars being disposed parallel to and above the second of said bars, at least one of said first and second bars having extending from its central area a snagging element, whereby the panel portion of a bag when the bag is pulled in a first direction, may be passed between the spacing between said bars and past said snagging element until the trailing transverse edge of the next ensuing bag partially defining the open space between the bags, as the bag including the leading transverse edge is pulled in the first direction, is intercepted by the snagging element and temporarily restrained, whereby, continued pulling of the preceding bag against such restraint results in detachment of the preceding bag from the ensuing bag, but the ensuing bag may be freed from such restraint by being pulled in a second direction transverse to the first direction.

10. Rack means as described in claim 9, wherein there is provided a second cradle means similar to the cradle means of claim 7, said second cradle means being parallel to, and spaced from, the other said cradle means; a second pair of bars similar to the pair of bars of claim 7 is also provided adjacently parallel to, but spaced from, the last said bars, and a guide member is disposed between the second cradle means and second pair of bars, said guide means being parallel to both the second cradle means and second pair of bars, and spaced from the path between the other cradle means and other pair of bars, thereby to prevent contact between bags of the second roll and bags of the first roll as the bags of both rolls are passed from their respective cradles to and through their respective pairs of bars.

*11. A method of dispensing one at a time a plurality of merchandise bags detachably joined together in a series, at a cashier's or other packer's station, each bag being formed of a pair of facing panels, joined at their bottoms and sides and having a top which is open at least for a predetermined extent intermediate its sides, each bag being detachably at least partially joined to two adjacent bags along its top and bottom edges so that at least a portion of the top edge of one bag is attached to the bottom edge of one adjacent bag, and the bottom edge of one said bag is attached at least partially to the top edge of the other adjacent bag, and along each said edge joinder a central section is unattached to leave an opening; said method comprising:*

*(a) rolling up said series of bags concentrically about a first axis whereby when said bags are unrolled each open space between adjacent bags will appear defined by the trailing transverse edge of the first bag and leading edge of the next ensuing bag;*

*(b) providing a support for the roll from which support bags may be serially unrolled and detached;*

*(c) providing a pair of bars spaced slightly apart from each other one bar above the other, said bars being parallel to the roll axis and disposed apart from and in line with the roll to allow a bag to be drawn through the spacing between the bars in a first direction of travel, at least one of said bars being provided with a snagging element directed in a second direction transverse to said first direction of travel, said snagging element, however, permitting passage of the panel portions of each bag past said snagging element in said first direction of travel, but snagging the leading transverse edge partially defining the opening between the bags as the bag including the leading transverse edge partially defining said opening is pulled in the first direction, and releasing the last said bag only when it is drawn between the bars initially in the second direction, and thereafter in the first direction;*

*(d) grasping the outermost bag of the roll by its leading transverse edge and pulling the last said bag initially in the second direction and then immediately in the first direction through the spacing between the bars and snagging element until the leading edge defining the opening between the bag so pulled and the next ensuing bag reaches the snagging element, whereupon further passage of the said next ensuing bag will be initially restrained by the projection of the snagging element through the opening;*

*(e) further pulling the bag including the trailing edge defining the last said opening against said restraint to where said bag is detached from the next ensuing bag along the joined edges;*

*(f) pulling the next ensuing bag first in the second direction past the snagging element and then in the first direction, until the leading edge defining the opening between the last said bag and following bag is snagged by the engaging element, and initially restrained; and*

*(g) repeating steps (e), and (f) in that order for subsequent bags in the series.*

*12. Rack means for dispensing separately from a roll of a series of plastic merchandise bags, each bag being formed by a pair of facing panels, joined at their bottoms and sides, the joinder of the panel bottoms forming a transverse bottom edge, and the panel tops being brought together to form a transverse open upper edge, and each bag being detachably joined to two adjacent bags at its opposite ends so that at one end the joinder is by the transverse upper edge of the adjacent bag, and at each joinder is an open space defined by a portion of the bottom edge of one bag and the transverse open edge of the adjacent bag, said series of bags of said roll being disposed concentrically about a first axis, whereby when the bags are unrolled each open space between adjacent bags will appear partially defined by a trailing transverse edge of the preceding bag and a leading transverse edge of the next ensuing bag, whereby each bag may be grasped and pulled for detachment from the next ensuing bag when the ensuing bag is sufficient restrained from movement to follow the preceding bag, said rack comprising:*

*(a) cradle means securable in the vicinity of a checkout counter, said cradle means being adapted to receive, and permit rotation of, said roll so that the bags on said roll may be unrolled about said first axis;*

*(b) a pair of bars disposed parallel to said first axis, said bars being spaced apart from each other, and both bars being spaced from, but aligned with, said roll and disposed in such a manner that a bag being unrolled from said roll, may be passed through the spacing between the bars, the first of said pair of bars being disposed parallel to and above the second of said bars, at least one of said first and second bars having extending from its central area a snagging element, whereby the panel portion of a bag when the bag is pulled in a first direction, may be passed between the spacing between said bars and past said snagging element until the leading transverse edge of the next ensuing bag partially defining the open space between the bags is intercepted by the snagging element and temporarily restrained, whereby, continued pulling of the preceding bag against such restraint results in detachment of the preceding bag from the ensuing bag, but the ensuing bag may be freed from such restraint by being pulled in a second direction transverse to the first direction.*

* * * * *